United States Patent
Kothandaraman et al.

(10) Patent No.: US 12,380,679 B2
(45) Date of Patent: Aug. 5, 2025

(54) SYSTEM AND METHODS FOR ACTIVE DOMAIN ADAPTATION

(71) Applicant: ADOBE INC., San Jose, CA (US)

(72) Inventors: Divya Kothandaraman, College Park, MD (US); Sumit Shekhar, Bengaluru (IN); Abhilasha Sancheti, Rajasthan (IN); Manoj Ghuhan Arivazhagan, Tamil Nadu (IN); Tripti Shukla, Uttar Pradesh (IN)

(73) Assignee: ADOBE INC., San Jose, CA (US)

( * ) Notice: Subject to any disclaimer, the term of this patent is extended or adjusted under 35 U.S.C. 154(b) by 795 days.

(21) Appl. No.: 17/648,482

(22) Filed: Jan. 20, 2022

(65) Prior Publication Data
US 2023/0230358 A1   Jul. 20, 2023

(51) Int. Cl.
*G06V 10/774* (2022.01)
*G06V 10/776* (2022.01)
*G06V 10/778* (2022.01)
*G06V 10/82* (2022.01)

(52) U.S. Cl.
CPC .......... *G06V 10/774* (2022.01); *G06V 10/776* (2022.01); *G06V 10/778* (2022.01); *G06V 10/82* (2022.01)

(58) Field of Classification Search
CPC .... G06V 10/774; G06V 10/778; G06V 10/82; G06V 10/776
See application file for complete search history.

(56) References Cited

U.S. PATENT DOCUMENTS

| | | | | |
|---|---|---|---|---|
| 9,373,087 | B2 * | 6/2016 | Nowozin et al. | G06N 99/00 |
| 2020/0334457 | A1 * | 10/2020 | Wang et al. | G06K 9/00 |
| 2021/0248324 | A1 * | 8/2021 | Choudhary | G06F 40/30 |

FOREIGN PATENT DOCUMENTS

| | | | | |
|---|---|---|---|---|
| CN | 111259940 A | * | 7/2020 | G06N 3/045 |
| CN | 113177562 A | * | 7/2021 | G06N 3/045 |
| DE | 102020215200 A1 | * | 6/2021 | G06N 3/045 |

OTHER PUBLICATIONS

1Wang, et al., 2014, "A new active labeling method for deep learning", In 2014 International joint conference on neural networks (IJCNN), pp. 112-119. IEEE, 2014, available at https://ieeexplore.ieee.org/document/6889457.

(Continued)

*Primary Examiner* — Vu Le
*Assistant Examiner* — Matthew Bobnark
(74) *Attorney, Agent, or Firm* — F. CHAU & ASSOCIATES, LLC

(57) ABSTRACT

Systems and methods for machine learning are described. The systems and methods include receiving target training data including a training image and ground truth label data for the training image, generating source network features for the training image using a source network trained on source training data, generating target network features for the training image using a target network, generating at least one attention map for training the target network based on the source network features and the target network features using a guided attention transfer network, and updating parameters of the target network based on the attention map and the ground truth label data.

20 Claims, 11 Drawing Sheets

(56) References Cited

OTHER PUBLICATIONS

2Roth, et al., 2006, "Margin-based active learning for structured output spaces", In European Conference on Machine Learning, pp. 413-424, Springer, 12 pages.
3Sener, et al., "Active learning for convolutional neural networks: A core-set approach", arXiv preprint arXiv:1708.00489v4 [stat.ML] Jun. 1, 2018, 13 pages.
4Sinha, et al., "Variational adversarial active learning", arXiv preprint arXiv:1904.00370v3 [cs.LG] Oct. 28, 2019, 12 pages.
5Ash, et al., "Deep batch active learning by diverse, uncertain gradient lower bounds", arXiv preprint arXiv:1906.03671v2 [cs.LG] Feb. 24, 2020, 26 pages.
6Zhdanov, "Diverse mini-batch active learning", arXiv preprint arXiv:1901.05954v1 [cs.LG] Jan. 17, 2019, 9 pages.
7Prabhu, et al., "Active Domain Adaptation via Clustering Uncertainty-weighted Embeddings", arXiv preprint arXiv:2010.08666v3 [cs.CV] Oct. 10, 2021, 17 pages.
8Kang, et al., "Contrastive Adaptation Network for Unsupervised Domain Adaptation", arXiv preprint arXiv:1901.00976v2 [cs.CV] Apr. 10, 2019, 10 pages.
9Long, et al., "Learning Transferable Features with Deep Adaptation Networks", arXiv preprint arXiv:1502.02791v2 [cs.LG] May 27, 2015, 9 pages.
10Sankaranarayanan, et al., "Generate to Adapt: Aligning Domains Using Generative Adversarial Networks", arXiv preprint arXiv:1704.01705v4 [cs.CV] Apr. 12, 2018, 11 pages.
11Shen, et al., "Wasserstein Distance Guided Representation Learning for Domain Adaptation", arXiv preprint arXiv: 1707.01217v4 [stat.ML] Mar. 9, 2018, 12 pages.
12Tzeng, et al., "Adversarial Discriminative Domain Adaptation", arXiv preprint arXiv:1702.05464v1 [cs.CV] Feb. 17, 2017, 10 pages.
13Bousmalis, et al., "Domain Separation Networks", arXiv preprint arXiv:1608.06019v1 [cs.CV] Aug. 22, 2016, 15 pages.
14Ghifary, et al., "Deep Reconstruction Classification Networks for Unsupervised Domain Adaptation", arXiv preprint arXiv:1607.03516v2 [cs.CV] Aug. 1, 2016, 21 pages.
15Mao, et al., "Unpaired Multi-domain Image Generation via Regularized Conditional GANs", arXiv preprint arXiv:1805.02456v1 [cs.CV] May 7, 2018, 7 pages.
16Hong, et al., 2018, "Conditional Generative Adversarial Network for Structured Domain Adaptation", In the 2018 IEEE/CVF Conference on Computer Vision and Pattern Recognition, 10 pages.
17Carlucci, et al., "AutoDIAL: Automatic domain alignment layers", arXiv preprint arXiv:1704.08082v3 [cs.CV] Nov. 27, 2017, 13 pages.
18Li, et al., 2018, "Adaptive Batch Normalization for practical domain adaptation", In Pattern Recognition 80 (2018), pp. 109-117, 9 pages.
19Li, et al., 2020, "Model adaptation: Unsupervised domain adaptation without source data," In 2020 IEEE/CVF Conference on Computer Vision and Pattern Recognition (CVPR), 10 pages.
20Masato, et al., "Source-free Domain Adaptation via Distributional Alignment by Matching Batch Normalization Statistics", arXiv preprint arXiv:2101.10842v1 [cs.CV] Jan. 19, 2021, 13 pages.
21Kurmi, et al., "Domain Impression: A Source Data Free Domain Adaptation Method", arXiv preprint arXiv:2102.09003v1 [cs.CV] Feb. 17, 2021, 11 pages.
22Liu, et al., "Source-free domain adaptation for semantic segmentation", arXiv preprint arXiv:2103.16372v1 [cs.CV] Mar. 30, 2021, 10 pages.
23Liang, et al., "Source data-absent unsupervised domain adaptation through hypothesis transfer and labeling transfer", arXiv preprint arXiv:2012.07297v3 [cs.CV] Dec. 5, 2021, 16 pages.
24Rai, et al., 2010, "Domain adaptation meets active learning", In Proceedings of the NAACL HLT 2010 Workshop on Active Learning for Natural Language Processing, 6 pages.
25Su, et al., "Active adversarial domain adaptation", arXiv preprint arXiv:1904.07848v2 [cs.CV] Mar. 9, 2020, 12 pages.
26Zhou, et al., "Discriminative active learning for domain adaptation", arXiv preprint arXiv:2005.11653v1 [cs.LG] May 24, 2020, 7 pages.
27Bouvier, et al., "Stochastic Adversarial Gradient Embedding for Active Domain Adaptation", arXiv preprint arXiv:2012.01843v1 [cs.LG] Dec. 3, 2020, 10 pages.
28Zhang, et al., "Self-attention generative adversarial networks", arXiv preprint arXiv:1805.08318v2 [stat.ML] Jun. 14, 2019, 10 pages.
29Li, et al., 2019, "Guided attention inference network", In IEEE Transactions on Pattern Analysis and Machine Intelligence, vol. 42, Issue 12, Dec. 1, 2020, available at https://ieeexplore.ieee.org/document/8733010.
30Mun, et al., 2017, "Text-guided attention model for image captioning", In Proceedings of the Thirty-First AAAI Conference on Artificial Intelligence (AAAI-17), pp. 4233-4239, 7 pages.
31Pang, et al., "Mask-guided attention network for occluded pedestrian detection", arXiv preprint arXiv:1910.06160v2 [cs.CV] Oct. 15, 2019, 9 pages.
32Yu, et al., "Deep modular co-attention networks for visual question answering", arXiv preprint arXiv:1906.10770v1 [cs.CV] Jun. 25, 2019, 11 pages.
33Vaswani, et al., "Attention is all you need", arXiv preprint arXiv:1706.03762v5 [cs.CL] Dec. 6, 2017, 15 pages.
34Kothandaraman, et al., "SS-SFDA: Self-Supervised Source-Free Domain Adaptation for Road Segmentation in Hazardous Environments", arXiv preprint arXiv:2012.08939v2 [cs.CV] Mar. 25, 2021, 12 pages.
35Deng, 2012, "The MNIST database of handwritten digit images for machine learning research [best of the web]", IEEE Signal Processing Magazine Nov. 2012, pp. 141-142, 2 pages.
36Sermanet, et al., "Convolutional neural networks applied to house numbers digit classification", arXiv preprint arXiv:1204.3968v1 [cs.CV] Apr. 18, 2012, 4 pages.
37Richter, et al., "Playing for data: Ground truth from computer games", arXiv preprint arXiv:1608.02192v1 [cs.CV] Aug. 7, 2016, 16 pages.
38Zhong, et al., "PubLayNet: largest dataset ever for document layout analysis", arXiv preprint arXiv:1908.07836v1 [cs.CL] Aug. 16, 2019, 8 pages.
39Cordts, et al., "The Cityscapes Dataset for Semantic Urban Scene Understanding," arXiv preprint arXiv:1604.01685v2 [cs.CV] Apr. 7, 2016, 29 pages.
40Yang, et al., "Learning to Extract Semantic Structure from Documents Using Multimodal Fully Convolutional Neural Networks", arXiv preprint arXiv:1706.02337v1 [cs.CV] Jun. 7, 2017, 16 pages.
41Saha, et al., 2011, "Active Supervised Domain Adaptation", In Gunopulos, et al. (eds), Machine Learning and Knowledge Discovery in Databases, ECML PKDD 2011, 16 pages.
42Saito, et al., "Semi-supervised domain adaptation via minimax entropy", arXiv preprint arXiv:1904.06487v5 [cs.CV] Sep. 14, 2019, 13 pages.
43Joshi, et al., 2012, "Scalable active learning for multiclass image classification", In IEEE Transactions on Pattern Analysis and Machine Intelligence, vol. 34, Issue 11, Nov. 2012, 16 pages.
44Nguyen, et al., 2004, "Active learning using pre-clustering", In Proceedings of the 21st International Conference on Machine Learning, 8 pages.
45Dagan, et al., 1995, "Committee-based sampling for training probabilistic classifiers", In Machine Learning Proceedings 1995, pp. 150-157, Elsevier, available at https://www.sciencedirect.com/science/article/pii/B978155860377650027X?via%3Dihub.
46Huang, et al., "Cost-effective training of deep CNNs with active model adaptation", arXiv preprint arXiv:1802.05394v2 [cs.LG] Jun. 5, 2018, 9 pages.
47Vu, et al., "ADVENT: Adversarial entropy minimization for domain adaptation in semantic segmentation", arXiv preprint arXiv:1811.12833v2 [cs.CV] Apr. 17, 2019, 12 pages.
48Tsai, et al., "Learning to adapt structured output space for semantic segmentation", arXiv preprint arXiv:1802.10349v3 [cs.CV] Jul. 6, 2020, 11 pages.

(56) References Cited

OTHER PUBLICATIONS

49Zou, et al., 2018, "Unsupervised domain adaptation for semantic segmentation via class-balanced self-training", In Proceedings of the 2018 European Conference on Computer Vision (ECCV), pp. 289-305, 17 pages.

50Chen, et al., "ROAD: Reality oriented adaptation for semantic segmentation of urban scenes", arXiv preprint arXiv:1711.11556v2 [cs.CV] Apr. 7, 2018, 10 pages.

51Nado, et al., "Evaluating prediction-time batch normalization for robustness under covariate shift", arXiv preprint arXiv:2006.10963v3 [cs.LG] Jan. 14, 2021, 27 pages.

52Wang, et al., "Tent: Fully test-time adaptation by entropy minimization", arXiv preprint arXiv:2006.10726v3 [cs.LG], Mar. 18, 2021.

53Prabhu, et al., "S4T: Source-free domain adaptation for semantic segmentation via self-supervised selective self-training", arXiv preprint arXiv:2107.10140v1 [cs.CV] Jul. 21, 2021, 17 pages.

54Wang, et al., "Alleviating semantic level shift: A semi-supervised domain adaptation method for semantic segmentation", arXiv preprint arXiv:2004.00794v2 [cs.CV] Jun. 9, 2020, 7 pages.

\* cited by examiner

SYSTEM AND METHODS FOR ACTIVE DOMAIN ADAPTATION

BACKGROUND

The following relates generally to image processing, and more specifically to active domain adaptation for image processing.

Domain adaptation refers to a machine learning technique in which a model that is pre-trained in a source domain is applied to a target domain. Active domain adaptation refers to a subset of domain adaptation in which a subset of source data from the source domain is selected to represent the whole source domain, and provided with label data.

However, current active domain adaptation systems are customized to tasks such as classification, and do not scale well to shifts in a label space where a source domain and a target domain do not contain the same classification categories or segmentation classes. Moreover, current active domain adaptation systems require a large amount of annotated source data, and these systems do not scale well to scenarios in which a system does not have access to source data after pre-training of an algorithm occurs.

SUMMARY

A method for active domain adaptation is described. One or more aspects of the method include receiving target training data including a training image and ground truth label data for the training image; generating source network features for the training image using a source network trained on source training data; generating target network features for the training image using a target network; generating at least one attention map for training the target network based on the source network features and the target network features using a guided attention transfer network; and updating parameters of the target network based on the attention map and the ground truth label data.

A method for active domain adaptation is described. One or more aspects of the method include receiving an image including an element that does not correspond to source label data in a source training set; generating image features for the image using a target network that is trained based on a target training set that includes label data corresponding to the element, wherein the target network is trained using transfer learning from a source network that is trained using the source training set, wherein the target network is trained using a guided attention transfer network that generates at least one attention map based on source network features from the source network and target network features from the target network; and decoding the image features to obtain target label data for the image.

An apparatus for active domain adaptation is described. One or more aspects of the system include a source network trained based on source training data from a source domain; a target network trained using transfer learning from the source network based on target training data from a target domain; and a guided attention transfer network configured to generate at least one attention map for guiding the transfer learning, wherein the at least one attention map is based on source network features from the source network and target network features from the target network.

DETAILED DESCRIPTION

The present disclosure describes a system and methods for active domain adaptation that can update parameters of a target network based on at least one generated attention map. In some examples, the attention map is generated by a deep-learning-based guided attention transfer network based on source network features and target network features. The source network features and the target network features are generated for a training image included in target training data that is received by an active learning component.

Active domain adaptation can be used to apply a model that has been pre-trained using representative source data from a source domain to a target domain. However, current active domain adaptation systems do not scale well in situations in which only the pre-trained model and not the data from the source domain is available to the systems. For example, source data on which the model was trained is often unavailable at the deployment time due to privacy concerns or space constraints of the deployed system. This situation therefore calls for source-free active domain adaptation.

To better accomplish such source-free active domain adaptation, an embodiment of the present disclosure includes a technologically advantageous, deep-learning based guided attention transfer network that can generate an attention map based on source network features and training network features. An embodiment of the present disclosure includes a technologically advantageous active learning component that can update parameters of the target network based on the attention map and ground truth label data. The source network features and the target network features are generated using a source network trained on source training data and a target network.

Accordingly, embodiments of the present disclosure can update a training network based on a trained source network, thereby effectively performing active domain adaptation without having access to the data that was used to train the source network.

Embodiments of the present disclosure may be used in an image processing context. For example, a machine learning apparatus according to the present disclosure may train a source network based on a source domain, train a target network based on a target domain, label an image using the target network, and provide the labeled image to the user. An example application of the inventive concept in the image processing context is provided with reference to FIGS. 1-2. Details regarding the architecture of an example machine learning apparatus are provided with reference to FIGS. 3-4. Examples of a process for active domain adaptation are provided with reference to FIGS. 5-6. Examples of training a machine learning model is provided with reference to FIGS. 7-11.

Image Processing System

Figure 1:
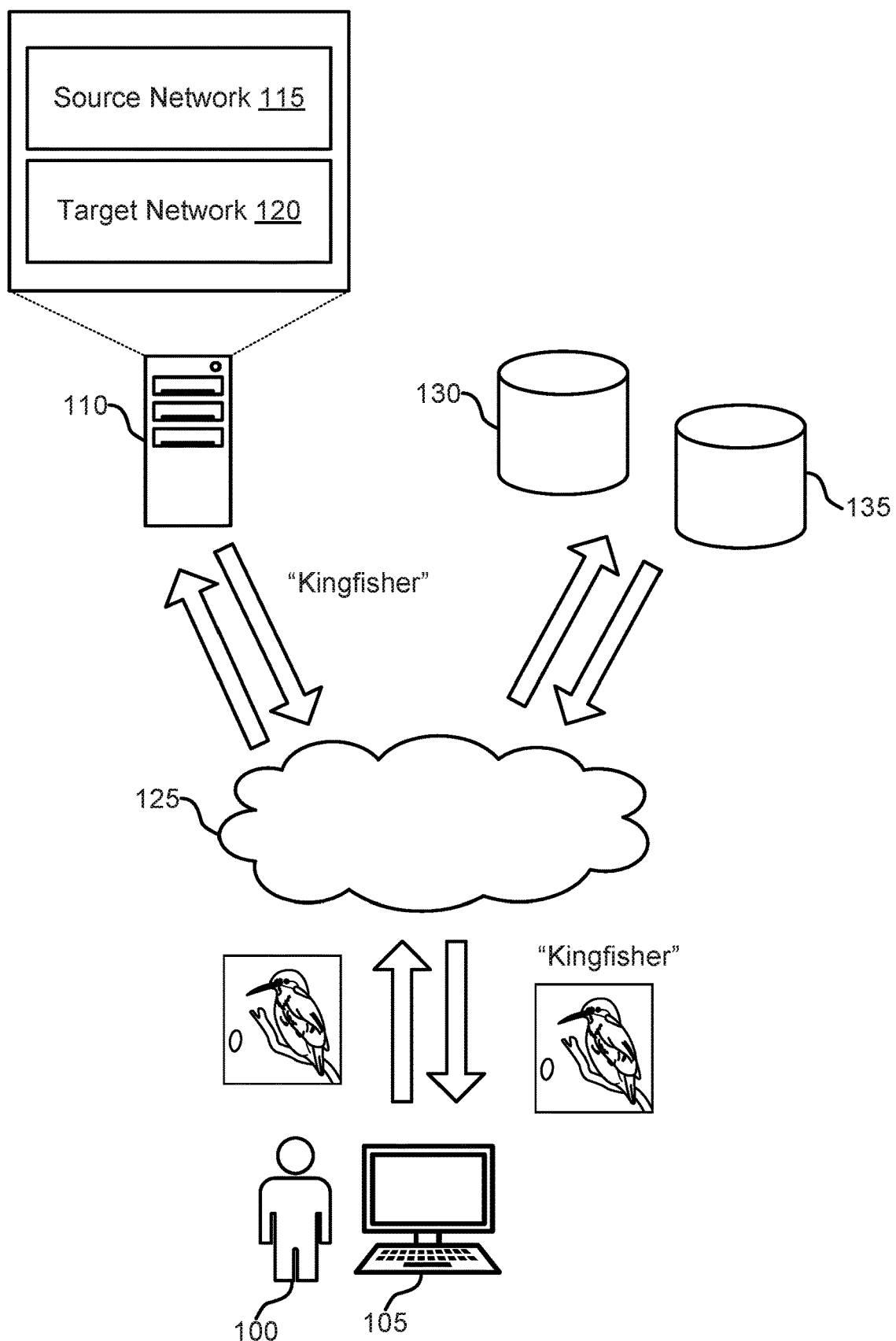
FIG. 1 shows an example of an image processing system according to aspects of the present disclosure.

FIG. 1 shows an example of an image processing system according to aspects of the present disclosure. The example shown includes user 100, user device 105, machine learning apparatus 110, source network 115, target network 120, cloud 125, source domain database 130, and target domain database 135.

One or more users 100 communicates with machine learning apparatus 110 via one or more user devices 105 and cloud 125. A user device 105 may be a personal computer, laptop computer, mainframe computer, palmtop computer, personal assistant, mobile device, or any other suitable processing apparatus. One or more users 100 may interact with user device 105 via a user interface and an input component. An input device may be a computer mouse, keyboard, keypad, trackball, and/or voice recognition device. An input component may include any combination of devices that allow users to input information into a computing device, such as buttons, a keyboard, switches, and/or dials. In addition, the input component may include a touch-screen digitizer overlaid onto the display that can sense touch and interact with the display. A user interface enables a user to interact with user device 105.

In some embodiments, the user interface may include an audio device, such as an external speaker system, an external display device such as a display screen, or an input device (e.g., remote control device interfaced with the user interface directly or through an input/output (IO) controller module). In some cases, a user interface may be a graphical user interface (GUI). In some examples, the user device 105 includes software that can display one or more unlabeled images for labeling, provide the one or more images to machine learning apparatus 110, and receive and display one or more labeled images from machine learning apparatus 110.

Machine learning apparatus 110 can include a computer implemented network that includes one or more neural networks. Machine learning apparatus 110 can also include one or more processors, a memory subsystem, a communication interface, an I/O interface, one or more user interface components, and a bus. Additionally, machine learning apparatus 110 can communicate with user device 105, source domain database 130, and target domain database 135 via cloud 125.

In one aspect, machine learning apparatus 110 includes source network 115 and target network 120. According to some aspects, source network 115 is trained based on source training data from a source domain. According to some aspects, source network 115 generates source network features for a training image. Source network 115 is an example of, or includes aspects of, the corresponding element described with reference to FIGS. 3 and 7.

According to some aspects, target network 120 generates target network features for the training image. In some examples, target network 120 generates predicted label data for the training image.

According to some aspects, target network 120 is trained using transfer learning from the source network 115 based on target training data from a target domain. In some examples, target network 120 is trained using a guided attention transfer network that generates at least one attention map based on source network features from the source network 115 and target network features from the target network 120.

According to some aspects, target network 120 receives an image including an element that does not correspond to source label data in a source training set. According to some aspects, target network 120 is trained based on a target training set that includes label data corresponding to the element. In some examples, target network 120 generates image features for the image using a target network 120. Target network 120 is an example of, or includes aspects of, the corresponding element described with reference to FIGS. 3 and 7.

In some cases, machine learning apparatus 110 is implemented on a server. A server provides one or more functions to users 100 linked by way of one or more of the various networks. In some cases, the server includes a single microprocessor board, which includes a microprocessor responsible for controlling all aspects of the server. In some cases, a server uses microprocessor and protocols to exchange data with other devices/users 100 on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

Machine learning apparatus 110 can be used, for example, in an image processing context. For example, a user may wish to label unlabeled images in a target domain using a neural network, and a conventional machine learning system may attempt to adapt a labeling model that has been trained on labeled images in order to accomplish this task. However, domain shifting or changing a distribution of data being fed to a machine learning system is a ubiquitous challenge for conventional machine learning systems. Conventional machine learning systems also do not scale well when the source data is no longer available. Therefore, some embodiments of machine learning apparatus 110 employ an active learning component to mine a subset of annotated data for bridging a domain gap between source and target domains. Some embodiments of machine learning apparatus 110 also employ a guided transfer network to effectively transfer knowledge of a pre-trained source network to a target network. Accordingly, machine learning apparatus 110 can adapt a source domain to a target domain to label an unlabeled image, for example, even without access to data in the source domain.

According to some aspects, machine learning apparatus 110 includes a source network 115 pre-trained on a source domain. In some examples, machine learning apparatus 110 mines a certain number of images from an unlabeled target for annotation or labeling. Machine learning apparatus 110 can mine the images in a way that facilitates transfer learning from the source domain and the learning of robust and generalizable feature representations for target domain images.

According to some aspects, machine learning apparatus 110 includes an active learning component to actively mine samples from the target domain. According to some aspects, machine learning apparatus 110 includes a guided attention transfer network (GATN) for source-free domain adaptation from pre-trained source network 115. In some examples, the active learning component samples images that transfer well from pre-trained source network 115 without any negative transfer and are important for the target domain, and the GATN learns robust target domain feature representation.

In some embodiments, the GATN includes a transformation network to modify source network features trained on the source domain so that they resemble target network features. In some embodiments, the GATN includes a spatial guided attention module and a channel guided attention module in which the target network 120 selectively distils useful features from the transformed source network features. In some embodiments, an attention weighted transfer learning loss governs the training of the GATN, along with task specific losses for a supervised subset. In some embodiments, the active learning component complements the GATN to intelligently choose samples for annotation such that they facilitate adaptation directed by the GATN as well as diversity in the target domain.

Domain adaptation according to embodiments of the inventive concept happens at a feature space (i.e., an output of the GATN prior to being input into a decoder), and so the domain adaptation can be applied across varied visual tasks such as classification, detection, and segmentation. In contrast, conventional machine learning systems are customized to a particular task and are not generalized. For example, a conventional machine learning system may be customized to classification, and may therefore perform segmentation poorly. Furthermore, embodiments of the inventive concept are label-space agnostic, enabling target domains that can contain different numbers and types of classes.

Figure 3:
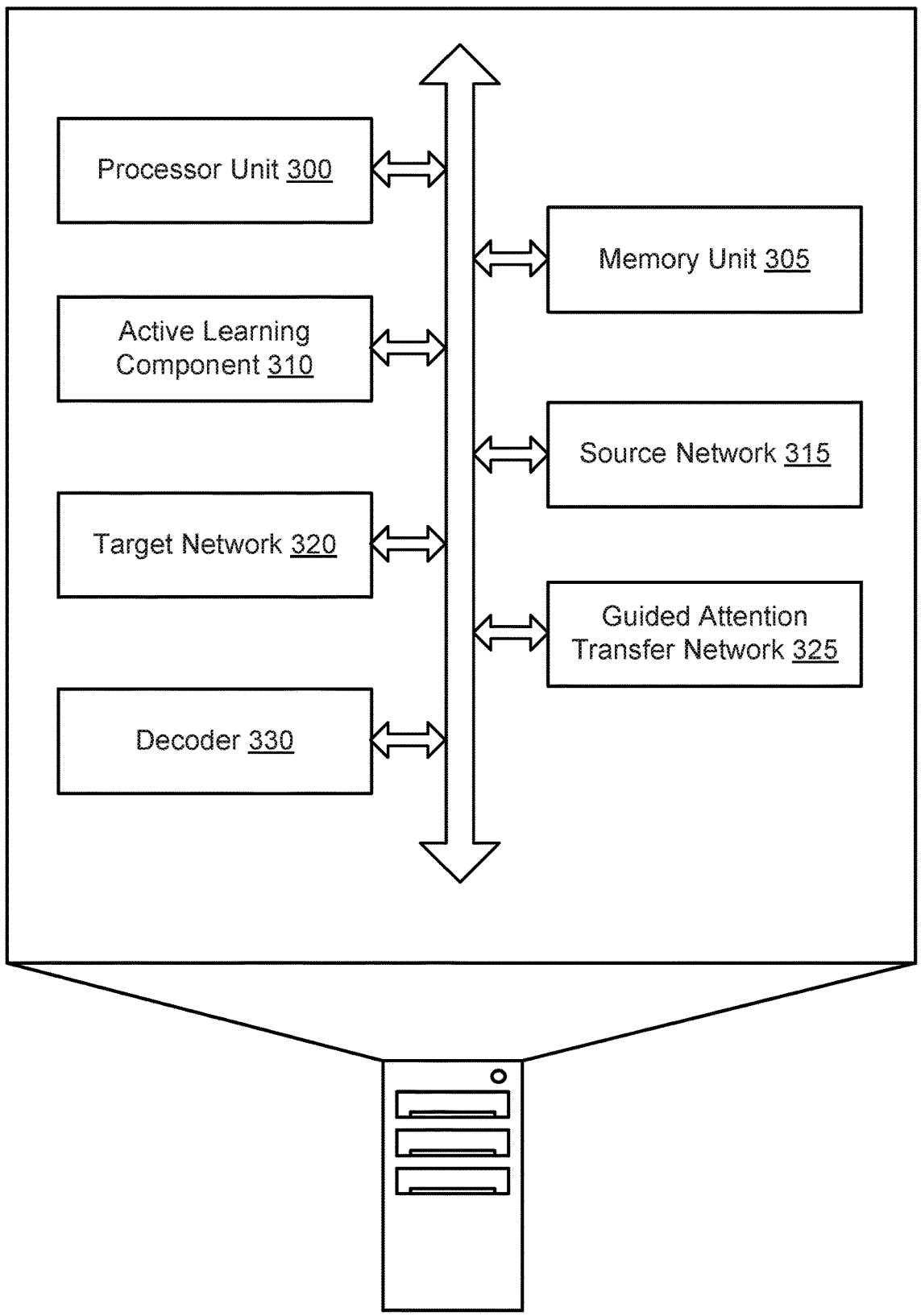
FIG. 3 shows an example of a machine learning apparatus according to aspects of the present disclosure.
Figure 4:
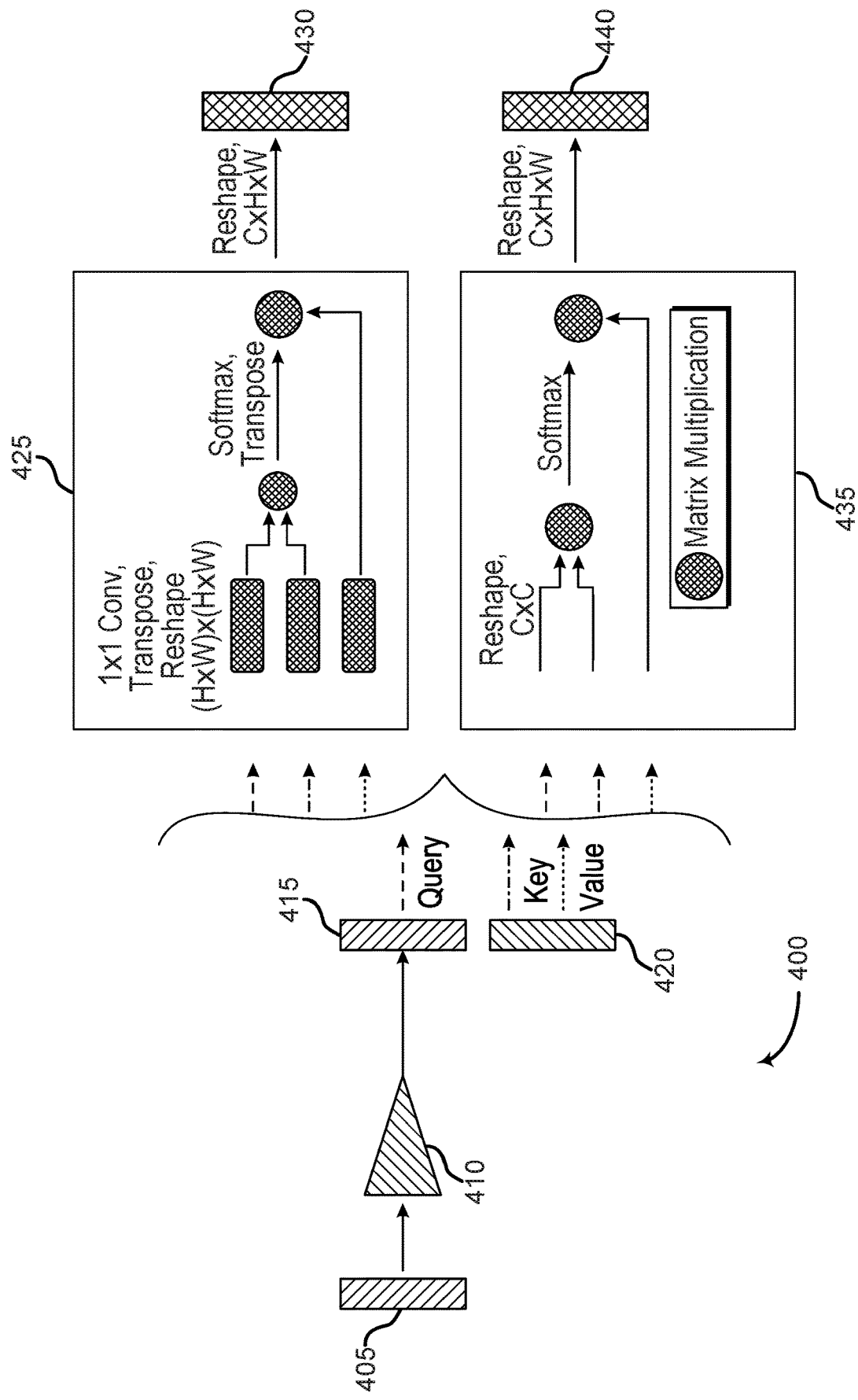
FIG. 4 shows an example of a guided attention transfer network according to aspects of the present disclosure.

Further detail regarding the architecture of machine learning apparatus 110 is provided with reference to FIGS. 3-4. Further detail regarding an active domain adaptation process will be provided with reference to FIGS. 5-6. Further detail regarding a process for training a machine learning model is provided with reference to FIGS. 7-11.

A cloud 125 is a computer network configured to provide on-demand availability of computer system resources, such as data storage and computing power. In some examples, the cloud 125 provides resources without active management by the user 100. The term cloud 125 is sometimes used to describe data centers available to many users 100 over the Internet. Some large cloud 125 networks have functions distributed over multiple locations from central servers. A server is designated an edge server if it has a direct or close connection to a user 100. In some cases, a cloud 125 is limited to a single organization. In other examples, the cloud 125 is available to many organizations. In one example, a cloud 125 includes a multi-layer communications network comprising multiple edge routers and core routers. In another example, a cloud 125 is based on a local collection of switches in a single physical location.

Source domain database 130 and target domain database 135 are examples of databases. A database is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, a user 100 interacts with database controller. In other cases, database controller may operate automatically without user 100 interaction.

Figure 2:
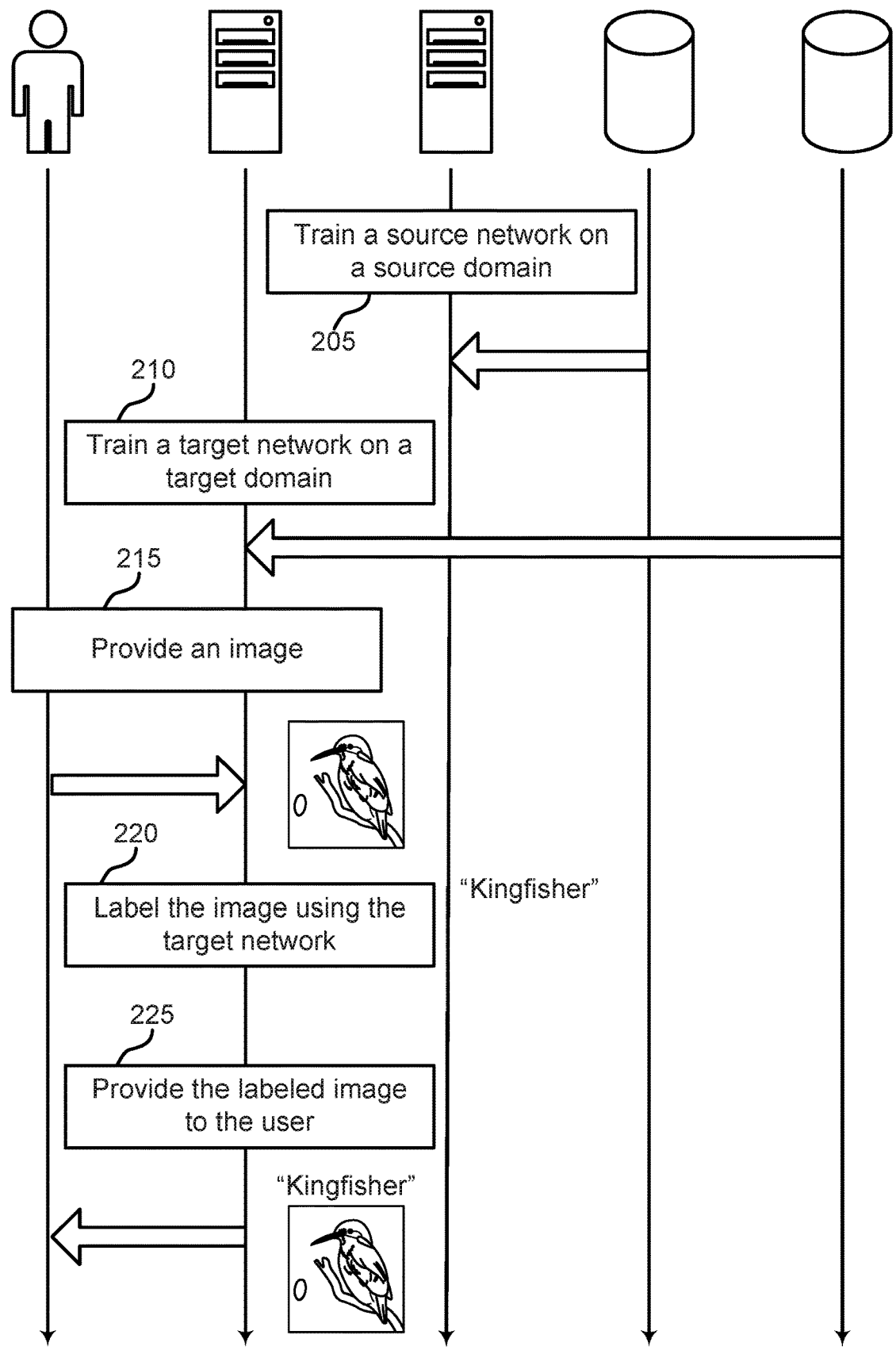
FIG. 2 shows an example of image processing according to aspects of the present disclosure.

FIG. 2 shows an example of image processing according to aspects of the present disclosure. Referring to FIG. 2, a machine learning apparatus according to the present disclosure may train a source network based on a source domain, train a target network based on a target domain, label an image using the target network, and provide the labeled image to the user.

At operation 205, the system trains a source network on a source domain. In some cases, the operations of this step refer to, or may be performed by, a machine learning apparatus as described with reference to FIG. 1. For example, in some cases, the source network can be an artificial neural network, and the source domain can contain labeled images that are stored in a source domain database. Further details regarding this operation are provided with reference to FIG. 7.

At operation 210, the system trains a target network on a target domain. In some cases, the operations of this step refer to, or may be performed by, a machine learning apparatus as described with reference to FIG. 1. For example, the target domain can be an artificial neural network, and the target domain can contain unlabeled images that are stored in a target domain database. Further details regarding this operation are provided with reference to FIG. 7.

At operation 215, the user provides an image. In some cases, the operations of this step refer to, or may be performed by, a machine learning apparatus as described with reference to FIG. 1. For example, the user may select and provide an unlabeled image via a user device to the machine learning apparatus.

At operation 220, the system labels the image using the target network. In some cases, the operations of this step refer to, or may be performed by, a target network and a decoder as described with reference to FIGS. 1, 3, and 7. For example, the target network can encode the image to produce an image representation, and provide the image representation to the decoder to obtain a labeled image. Further details regarding this operation are provided with reference to FIGS. 5-6.

At operation 225, the system provides the labeled image to the user. In some cases, the operations of this step refer to, or may be performed by, a machine learning apparatus as described with reference to FIG. 1. For example, the machine learning apparatus can provide the labeled image to the user via a user device.

System Architecture

An apparatus for machine learning is described. One or more aspects of the apparatus include a source network trained based on source training data from a source domain; a target network trained using transfer learning from the source network based on target training data from a target domain; and a guided attention transfer network configured to generate at least one attention map for guiding the transfer learning, wherein the at least one attention map is based on source network features from the source network and target network features from the target network.

Some examples of the apparatus further include an active learning component configured to select target training images for the target training data based on an active learning heuristic. In some aspects, the guided attention transfer network comprises a transformation network configured to transform the source network features. In some aspects, the guided attention transfer network is trained jointly together with the target network.

FIG. 3 shows an example of a machine learning apparatus according to aspects of the present disclosure. The example shown includes processor unit 300, memory unit 305, active learning component 310, source network 315, target network 320, guided attention transfer network 325, and decoder 330. The machine learning apparatus of FIG. 3 can be a personal computer, laptop computer, mainframe computer, palmtop computer, personal assistant, mobile device, or any other suitable processing apparatus. In some embodiments, the machine learning apparatus of FIG. 3 is an example of, or includes aspects of, machine learning apparatus 110 of FIG. 1.

Processor unit 300 can include one or more processors. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 300 is configured to operate a memory array included in memory unit 305 using a memory controller. In other cases, a memory controller is integrated into processor unit 300. In some cases, processor unit 300 is configured to execute computer-readable instructions stored in memory unit 305 to perform various functions. In some embodiments, processor unit 300 includes special purpose components for modem processing, baseband processing, digital signal processing, or transmission processing.

Memory unit 305 can include one or more memory devices. Examples of a memory device include random access memory (RAM), read-only memory (ROM), or a hard disk. Examples of memory devices include solid state memory and a hard disk drive. In some embodiments, memory unit 305 can include a memory array that includes a plurality of memory cells. In some examples, memory unit 305 can store computer-readable, computer-executable software including instructions that, when executed, cause a processor of processor unit 300 to perform various functions described herein. In some cases, memory unit 305 contains, among other things, a basic input/output system (BIOS) which controls basic hardware or software operation such as interactions with peripheral components or devices. In some cases, memory unit 305 includes a memory controller that operates memory cells of memory unit 305. For example, the memory controller can include a row decoder, column decoder, or both. In some cases, memory cells within memory unit 305 store information in the form of a logical state.

The machine learning apparatus of FIG. 3 can include one or more artificial neural networks (ANNs). In some aspects, each of active learning component 310, source network 315, target network 320, guided attention transfer network 325, and decoder 330 can be implemented as one or more ANNs.

An artificial neural network (ANN) is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

During a training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times. In some embodiments, active learning component 310 can perform the training process.

The term "loss function" refers to a function that impacts how a machine learning model is trained in a supervised learning setting. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

According to some aspects, active learning component 310 receives target training data including a training image and ground truth label data for a training image. In some examples, active learning component 310 updates parameters of the target network 320 based on an attention map and the ground truth label data. In some examples, active learning component 310 computes a difference between target network features and source network features. In some examples, active learning component 310 computes a transfer loss based on a product of at least one attention map and the difference, where the parameters of the target network 320 are updated based on the transfer loss.

In some examples, active learning component 310 compares predicted label data to the ground truth label data. In some examples, active learning component 310 computes a task loss based on the comparison, where the parameters of the target network 320 are updated based on the task loss.

In some examples, active learning component 310 trains the source network 315 using source training data, where the source training data includes samples from a source domain, and where the source training data is not available when the parameters of the target network 320 are updated. In some examples, active learning component 310 selects samples from a target domain to annotate based on an active learning heuristic to identify target training data, where the samples are selected based on a fixed budget of samples. According to some aspects, active learning component 310 is configured to select target training images for the target training data based on the active learning heuristic. In some examples, active learning component 310 generates the ground truth label data based on the selection, where the ground truth label data includes labels that are not included in the source training data.

In some examples, active learning component 310 computes a gradient parameter of the training image using the source network 315, where the active learning heuristic is based on the gradient parameter. In some examples, active learning component 310 computes an entropy parameter of the training image using the target network 320, where the active learning heuristic is based on the entropy parameter. In some examples, active learning component 310 computes a clustering score of the training image, where the active learning heuristic is based on the clustering score.

Active learning component 310 is an example of, or includes aspects of, the corresponding element described with reference to FIG. 7.

According to some aspects, source network 315 is trained based on source training data from a source domain. According to some aspects, source network 315 generates source network features for a training image. Source network 315 is an example of, or includes aspects of, the corresponding element described with reference to FIGS. 1 and 7.

According to some aspects, target network 320 generates target network features for the training image. In some examples, target network 320 generates predicted label data for the training image.

According to some aspects, target network 320 is trained using transfer learning from the source network 315 based on target training data from a target domain. In some examples, target network 320 is trained using a guided attention transfer network that generates at least one attention map based on source network features from the source network 315 and target network features from the target network 320.

According to some aspects, target network 320 receives an image including an element that does not correspond to source label data in a source training set. According to some aspects, target network 320 is trained based on a target training set that includes label data corresponding to the element. In some examples, target network 320 generates image features for the image using a target network 320. Target network 320 is an example of, or includes aspects of, the corresponding element described with reference to FIGS. 1 and 7.

In some aspects, the target training set is generated using an active learning heuristic based on a gradient parameter from the source network 315, an entropy parameter from the target network 320, a clustering parameter, or any combination thereof.

According to some aspects, guided attention transfer network 325 generates at least one attention map for training the target network 320 based on the source network features and the target network features. In some examples, guided attention transfer network 325 generates a query vector based on the source network features. In some examples, guided attention transfer network 325 generates a key vector and a value vector based on the target network features, where the at least one attention map is based on the query vector, the key vector, and the value vector.

In some aspects, guided attention transfer network 325 includes a transformation network. In some examples, guided attention transfer network 325 transforms the source network features using the transformation network, where the query vector is based on the transformed source network features. In some aspects, the at least one attention map includes a guided spatial attention map that indicates regions of the training image that encourage effective transfer learning from the source network 315 to the target network 320. In some aspects, the at least one attention map includes a guided channel attention map that indicates channels of the source network features that encourage effective transfer learning from the source network 315 to the target network 320.

In some aspects, the guided attention transfer network 325 generates a query vector based on the source network 315 features and a key vector and a value vector based on the target network 320 features. In some aspects, the at least one attention map includes a guided spatial attention map and a guided channel attention map.

According to some aspects, guided attention transfer network 325 is configured to generate at least one attention map for guiding the transfer learning, wherein the at least one attention map is based on source network features from the source network 315 and target network features from the target network 320. In some aspects, the guided attention transfer network 325 includes a transformation network configured to transform the source network features. In some aspects, the guided attention transfer network 325 is trained jointly together with the target network 320.

Guided attention transfer network 325 is an example of, or includes aspects of, the corresponding element described with reference to FIGS. 4 and 7.

According to some aspects, decoder 330 decodes the image features to obtain target label data for the image. Decoder 330 is an example of, or includes aspects of, the corresponding element described with reference to FIG. 7.

FIG. 4 shows an example of a guided attention transfer network (GATN) 400 according to aspects of the present disclosure. The example shown includes source network features 405, transformation network 410, transformed source network features 415, target network features 420, guided spatial attention (GSA) module 425, GSA map 430, guided channel attention (GCA) module 435, and GCA map 440.

In the machine learning field, an attention mechanism is a method of placing differing levels of importance on different elements of an input. Calculating attention can involve three basic steps. First, a similarity between query and key vectors obtained from the input is computed to generate attention weights. Similarity functions used for this process can include dot product, splice, detector, and the like. Next, a softmax function is used to normalize the attention weights. Finally, the attention weights are weighed together with their corresponding values. GATN 400 employs an attention function as a mapping of a query and a set of key-value pairs to an output, where the key, query, value, and output are all vectors.

Referring to FIG. 4, according to some aspects, GATN 400 can include transformation network 410, GSA module 425, and GCA module 435. In some examples, GATN 400 generates a query vector based on the source network features 405. In some examples, GATN 400 transforms the source network features 405 using the transformation network 410, where the query vector is based on the transformed source network features 415. For example, in some embodiments, a trained source network according to embodiments of the present disclosure can compute source network features 405 and provide source network features 405 to transformation network 410 to be transformed into transformed source network features 415.

In some embodiments, transformation network 410 is a four-layer convolutional neural network (CNN). A CNN is a class of ANN that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input. Transformation network 410 transforms the source network features 405 so that they transfer/align well to the target network.

In some aspects, GATN 400 generates a key vector and a value vector based on target network features 420. For example, a target network according to embodiments of the present disclosure can compute target network features 420 and provide the target network features 420 to GATN 400 to generate a key vector and a value vector.

GATN 400 can include GSA module 425 and GCA module 435. According to some aspects, GATN 400 generates at least one attention map for training a target network based on the transformed source network features 415 and the target network features 420. In some embodiments, the at least one attention map is based on the query vector, the key vector, and the value vector. Referring to FIG. 4, the dimensions of each of the transformed source network features 415, the target network features 420, and the at least one attention map can be represented as C×H×W.

In some aspects, the at least one attention map includes a GSA map 430 that indicates regions of a training image that encourage effective transfer learning from the source network to the target network. For example, GSA module 425 is a spatial attention network (SAN) that can employ GSA to calculate GCA map 440. A SAN is a variant of a CNN that is designed to exploit a spatial context of images. A SAN utilizes attention weights for clustered regional features. The attention weights indicate the value of the contribution of different regions to the overall classification. In some cases, a SAN uses a weighted sum of regional features as discriminative features. Thus, a SAN draws attention to important contents by giving them a higher attention weight.

GSA module 425 spatially highlights regions of the transformed source network features 415 that align well with the target network features 420. The target network includes target domain-specific knowledge through a labeled subset from the source domain, and this can be leveraged to guide a transfer learning process. In some embodiments, GSA module empowers the target network to choose or guide spatial level features from the source network that it deems suitable for transferring back to itself. As target network features 420 guide the attention process, GATN 400 designates target network features 420 as the query vectors. Similarly, GATN 400 assigns key vectors and value vectors are to transformed source network features 415. 1×1 convolution layers of GSA module 425 transform the key, query and value vectors. GSA module 425 then reshapes these vectors to the shape (H×W)×(H×W), which are used to compute attention weights $A_{GSA}$ as follows:

$$A_{GSA} = S(C_q(F_{S-tr}^T) \odot C_k(F_T)^T \odot C_v(F_T)) \quad (1)$$

where $F_S$ represents source network features 405, $F_{S-tr}$ represents transformed source network features 415, $F_T$ represents target network features 420, T, S, and $\odot$ denote transpose operation, softmax, and matrix multiplication, respectively, and $C_k$, $C_q$, and $C_v$ denote convolution followed by reshaping of the key, query, and value vectors, respectively. GSA module 425 reshapes attention weights $A_{GSA}$ to C×H×W to produce GSA map 430.

In some aspects, the at least one attention map includes a GCA map 440 that indicates channels of the transformed source network features 415 that encourage effective transfer learning from the source network to the target network. For example, in some embodiments, GCA module 435 highlights attributes (or channel-level features at each spatial location) of transformed source network features 415 at each spatial location that aligns well with the target network features 420. In a similar manner to GSA module 425, GCA module 435 empowers the target network to choose or guide attribute/channel-level features at each spatial location from the source network that it deems suitable for transferring back to itself. GCA module 435 designates the query vector to transformed source network features 415, and the key and value vectors to the target network features 420. GCA module 435 reshapes the target network features to dimensions C×C (denoted by $C_R$). GCA module 435 can then calculate attention weights $A_{GCA}$ as follows:

$$A_{GCA} = S(C_R(F_{S-tr}^T) \odot C_R(F_T)^T \odot C_R(F_T)) \quad (2)$$

where T, S, and $\odot$ denote transpose operation, softmax, and matrix multiplication, respectively. GCA module 435 can then reshape attention weights $A_{GCA}$ to C×H×W to produce GCA map 440.

GATN 400 is an example of, or includes aspects of, the corresponding element described with reference to FIGS. 3 and 7. Source network features 405 are an example of, or includes aspects of, the corresponding element described with reference to FIGS. 3 and 7. Transformation network 410 is an example of, or includes aspects of, the corresponding element described with reference to FIG. 3. Transformed source network features 415 are an example of, or includes aspects of, the corresponding element described with reference to FIG. 3. Target network features 420 are an example of, or includes aspects of, the corresponding element described with reference to FIGS. 3 and 7. GSA module 425 is an example of, or includes aspects of, the corresponding element described with reference to FIG. 7. GCA module 435 is an example of, or includes aspects of, the corresponding element described with reference to FIG. 7.

Image Processing

A method for image processing is described. One or more aspects of the method include receiving an image including an element that does not correspond to source label data in a source training set; generating image features for the image using a target network that is trained based on a target training set that includes label data corresponding to the element, wherein the target network is trained using transfer learning from a source network that is trained using the source training set, wherein the target network is trained using a guided attention transfer network that generates at least one attention map based on source network features from the source network and target network features from the target network; and decoding the image features to obtain target label data for the image.

In some aspects, the guided attention transfer network generates a query vector based on the source network features and a key vector and a value vector based on the target network features. In some aspects, the at least one attention map includes a guided spatial attention map and a GCA map.

In some aspects, the target training set is generated using an active learning heuristic based on a gradient parameter from the source network, an entropy parameter from the target network, a clustering parameter, or any combination thereof.

Figure 5:
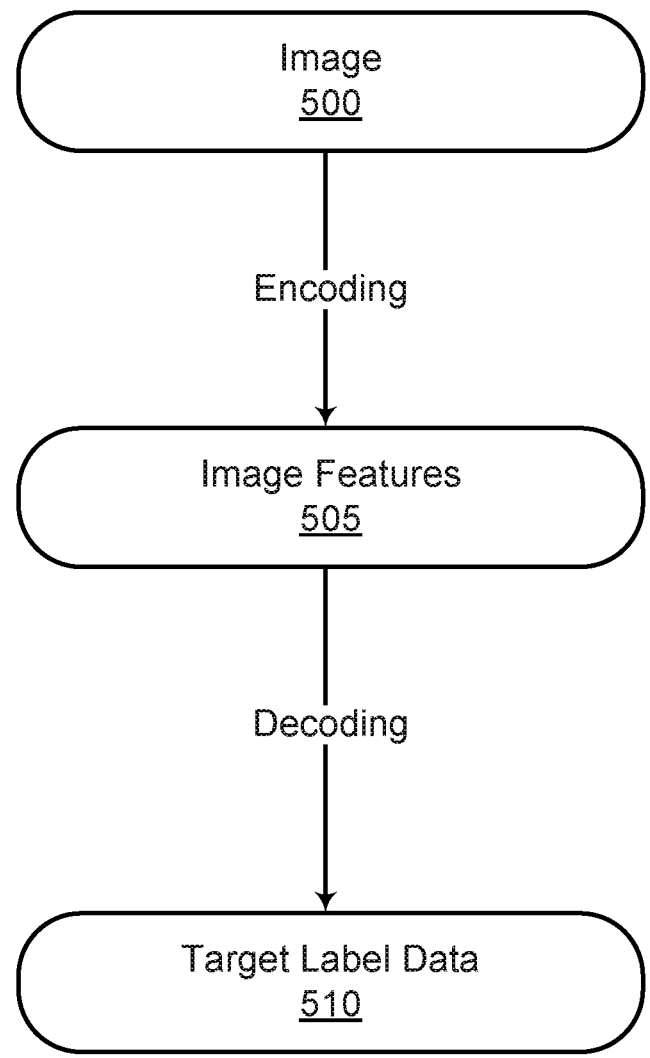
FIG. 5 shows an example of an image processing process according to aspects of the present disclosure.

FIG. 5 shows an example of an image processing process according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 5, a user may wish to label an unlabeled image using machine learning, but does not have access to image-label pairs in a source domain that a source network has been trained on. According to embodiments of the present disclosure, a machine learning apparatus can employ active domain adaptation and active learning to adapt a trained source network to a target network so that the target network is trained to produce labeled images.

The system receives image 500 as an input and encodes image 500 to output image features 505. In some cases, the operations of this step refer to, or may be performed by, a target network as described with reference to FIGS. 1, 3, and 7. For example, the target network can encode image 500 and output image features 505 as described with reference to FIG. 7.

The system receives image features 505 as an input decodes image features 505 to output target label data 510. In some cases, the operations of this step refer to, or may be performed by, a decoder as described with reference to FIGS. 3 and 7. For example, the decoder can decode image features 505 and output target label data 510 as described with reference to FIG. 7.

Figure 6:
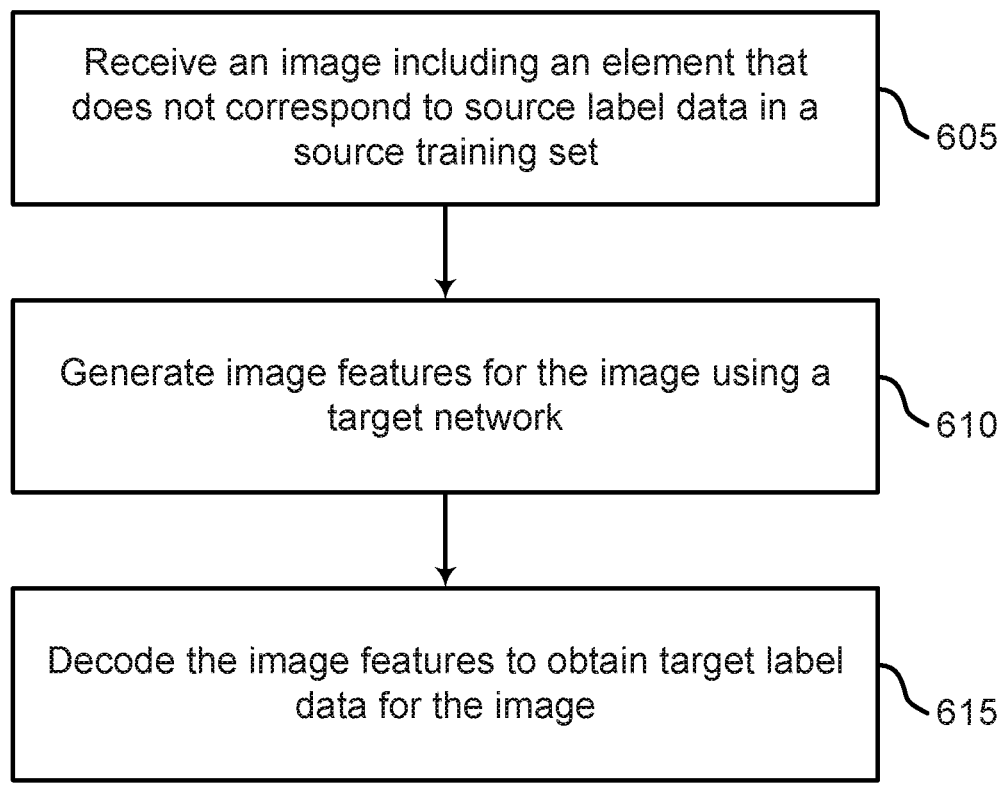
FIG. 6 shows an example of a process for obtaining target label data according to aspects of the present disclosure.

FIG. 6 shows an example of obtaining target label data according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system receives an image including an element that does not correspond to source label data in a source training set. In some cases, the operations of this step refer to, or may be performed by, a target network as described with reference to FIGS. 1, 3, and 7.

At operation 610, the system generates image features for the image using a target network. In some cases, the operations of this step refer to, or may be performed by, a target network as described with reference to FIGS. 1, 3, and 7.

At operation 615, the system decodes the image features to obtain target label data for the image. In some cases, the operations of this step refer to, or may be performed by, a decoder as described with reference to FIGS. 3 and 7.

Training

A method for machine learning is described. One or more aspects of the method include receiving target training data including a training image and ground truth label data for the training image; generating source network features for the training image using a source network trained on source training data; generating target network features for the training image using a target network; generating at least one attention map for training the target network based on the source network features and the target network features using a guided attention transfer network; and updating parameters of the target network based on the attention map and the ground truth label data.

Some examples of the method further include generating a query vector based on the source network features. Some examples further include generating a key vector and a value vector based on the target network features, wherein the at least one attention map is based on the query vector, the key vector, and the value vector.

Some examples of the method further include transforming the source network features using a transformation network of the guided attention transfer network, wherein the query vector is based on the transformed source network features.

In some aspects, the at least one attention map includes a guided spatial attention map that indicates regions of the training image that encourage effective transfer learning from the source network to the target network.

In some aspects, the at least one attention map includes a guided channel attention map that indicates channels of the source network features that encourage effective transfer learning from the source network to the target network.

Some examples of the method further include computing a difference between the target network features and the source network features. Some examples further include computing a transfer loss based on a product of the at least one attention map and the difference, wherein the parameters of the target network are updated based on the transfer loss.

Some examples of the method further include generating predicted label data for the training image using the target network. Some examples further include comparing the predicted label data to the ground truth label data. Some examples further include computing a task loss based on the comparison, where the parameters of the target network are updated based on the task loss.

Some examples of the method further include training the source network using source training data, wherein the source training data includes samples from a source domain, and wherein the source training data is not available when the parameters of the target network are updated. Some examples further include selecting samples from a target domain to annotate based on an active learning heuristic to identify the target training data, wherein the samples are selected based on a fixed budget of samples.

Some examples of the method further include generating the ground truth label data based on the selection, wherein the ground truth label data includes labels that are not included in the source training data. Some examples of the method further include computing a gradient parameter of the training image using the source network, wherein the active learning heuristic is based on the gradient parameter.

Some examples of the method further include computing an entropy parameter of the training image using the target network, wherein the active learning heuristic is based on the entropy parameter. Some examples of the method further include computing a clustering score of the training image, wherein the active learning heuristic is based on the clustering score.

Figure 7:
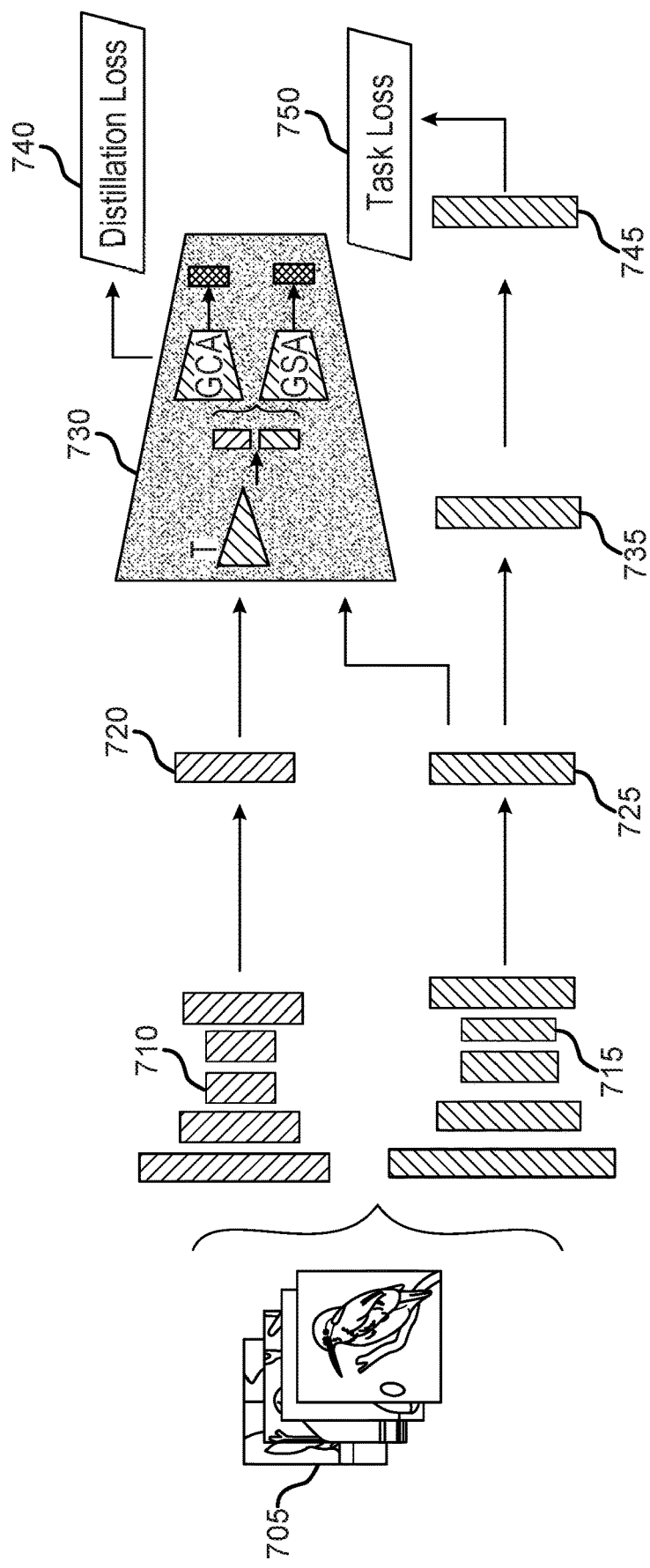
FIG. 7 shows an example of an active domain adaptation process according to aspects of the present disclosure.

FIG. 7 shows an example of a machine learning process according to aspects of the present disclosure. The example shown includes training image 705, source network 710, target network 715, source network features 720, target network features 725, GATN 730, decoder 735, distillation loss 740, outputs 745, and task loss 750.

Referring to FIG. 7, an active learning component according to embodiments of the present disclosure can increase the effectiveness of GATN 730 and target network 715 in machine learning tasks by mining target training data according to an active learning heuristic $H_{AL}$. The active learning heuristic $H_{AL}$ balances trade-off transferability from the source network with the uncertainty and diversity of the samples that it chooses. The active learning component uses a combination of a gradient from pre-trained source network 710 to address transfer learning, where a low gradient implies high confidence and therefore high transferability, entropy of target network 715 from a previous iteration of the active learning heuristic $H_{AL}$ (where high entropy implies high uncertainty, and therefore indicates a set of samples that the target network would benefit from learning from). The active learning component uses a k-means clustering score $K_T$ addresses diversity that can be calculated as follows:

$$H_{AL} = \lambda_G * \log G_S - \lambda_E \log E_T - \lambda_K * \log K_T \quad (3)$$

where $\lambda_G$, $\lambda_E$, and $\lambda_K$ are binary variables that toggle the metrics used for sampling. Depending on a budget b for sampling, the active learning component picks b images with the lowest score. For the first iteration of the active learning heuristic $H_{AL}$, $\lambda_G$ is set to 1 and $\lambda_E$ and $\lambda_K$ are set to 0; therefore, the active learning component exclusively mines samples from the pre-trained source network 710 and attempts to bridge a gap between the source domain and the target domain.

Accordingly, the active learning component can increase the effectiveness and of GATN 730 and target network 715 via robust sampling according to the active learning heuristic $H_{AL}$. The active learning component mines samples such that transfer learning is facilitated, as well as uncertainty and diversity. The active learning component can repeatedly train the target network by cumulatively mining samples from a dataset in batches until a desired budget b is achieved and the samples are annotated, providing a labeled target subset and an unlabeled target subset Given the subset of a target dataset chosen by the active learning component, pre-trained and frozen source network 710 is used to generate source network features 720. The target network 715 is initialized with parameters of source network 710 and is used to generate target network features 725. Source network features 720 and target network features 725 are passed through GATN 730, and an active learning component according to embodiments of the present disclosure can constrain target network 715 via a distillation loss $L_{Tr}$. Distillation loss $L_{Tr}$ is a transfer learning loss computed as the attention weighted mean square difference between the transformed source network features described with reference to FIG. 4 and the target network features 725. Transfer learning refers to a machine learning technique in which the objective is to learn a target conditional probability distribution in a target domain given a target task, information learned from a source domain, and a corresponding source task, where the source domain is not the same as the target domain and the source task is not the same as the target task. The extent to which the transformed source network features are aligned with the target network features 725 is provided via the one or more attention maps. The distillation loss $L_{Tr}$ is applied to the target training data and is scaled by a hyperparameter $\lambda_{Tr}$. The active learning component can calculate the distillation loss $L_{Tr}$ as follows:

$$L_{Tr} = A_{GSA} * [F_{S-tr} - F_T]^2 + A_{GCA} * [F_{S-tr} - F_T]^2 \quad (4)$$

The target network features 725 are then passed through decoder 735 to compute outputs 745, which are constrained by the active learning component via a task specific loss $L_{task}$. In some embodiments, the task specific loss $L_{task}$ can be a task loss such as multi-class cross entropy for classification and semantic segmentation tasks and a focal loss for object detection tasks for a labeled subset of target domain images. In some embodiments, the task specific loss $L_{task}$ is scaled by a hyperparameter $\lambda_{Tr}$. In some embodiments, the hyperparameter $\lambda_{Tr}$ is set to a value of 1.0. The training of GATN 730 along with the target network 715 is dictated by the transfer learning loss $L_{Tr}$ and the task specific loss $L_{task}$.

Source network 710 is an example of, or includes aspects of, the corresponding element described with reference to FIGS. 1 and 3. Target network 715 is an example of, or includes aspects of, the corresponding element described with reference to FIGS. 1 and 3. Source network features 720 are an example of, or includes aspects of, the corresponding element described with reference to FIG. 4. Target network features 725 are an example of, or includes aspects of, the corresponding element described with reference to FIG. 4. GATN 730 is an example of, or includes aspects of, the corresponding element described with reference to FIG. 3. Decoder 735 is an example of, or includes aspects of, the corresponding element described with reference to FIG. 3.

Figure 8:
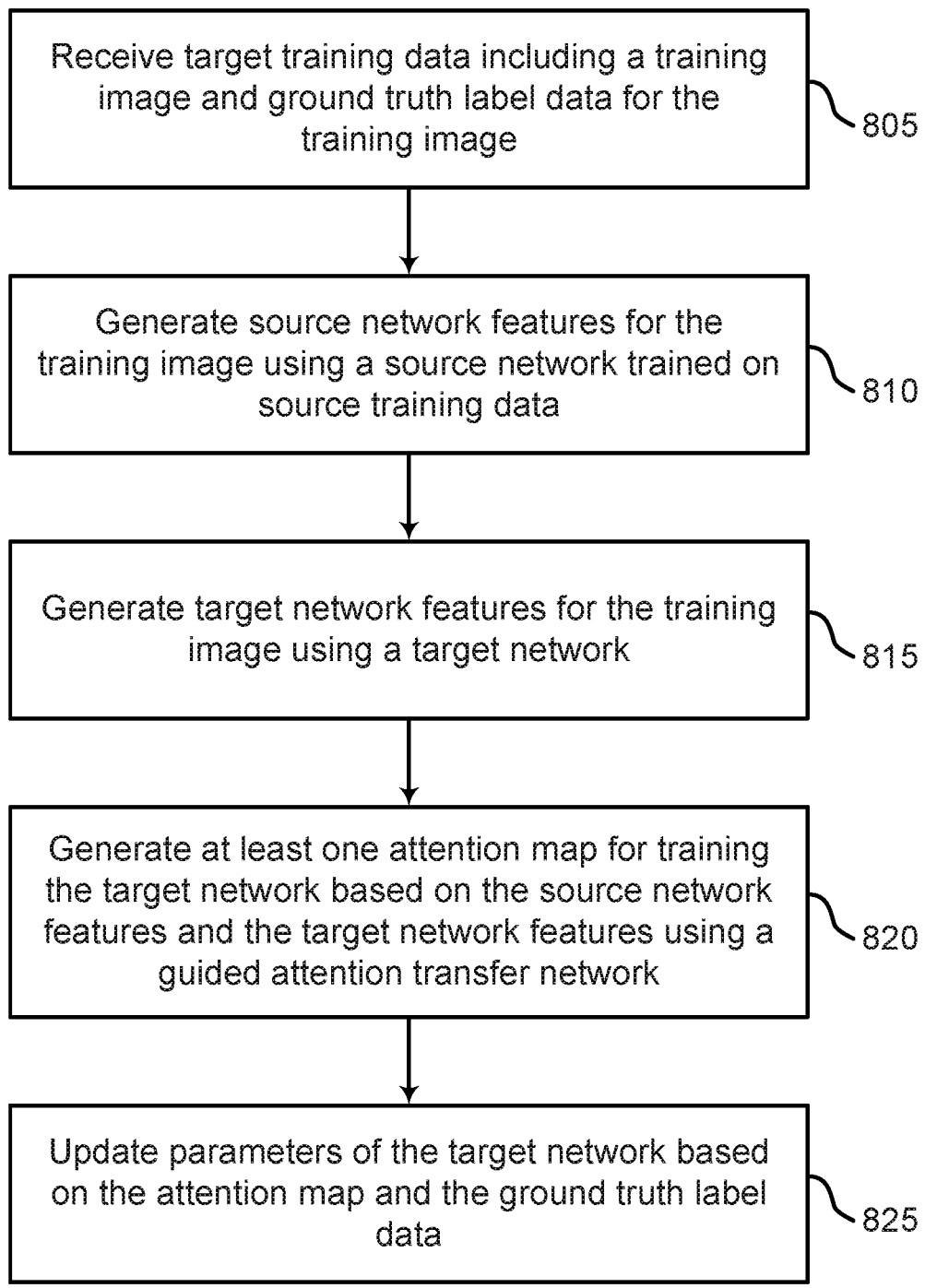
FIG. 8 shows an example of a process for updating parameters of a target network according to aspects of the present disclosure.

FIG. 8 shows an example of 800 for updating parameters of a target network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system receives target training data including a training image and ground truth label data for the training image. In some cases, the operations of this step refer to, or may be performed by, an active learning component as described with reference to FIG. 3.

At operation 810, the system generates source network features for the training image using a source network trained on source training data. In some cases, the operations of this step refer to, or may be performed by, a source network as described with reference to FIGS. 1, 3, and 7.

At operation 815, the system generates target network features for the training image using a target network. In some cases, the operations of this step refer to, or may be performed by, a target network as described with reference to FIGS. 1, 3, and 7.

At operation 820, the system generates at least one attention map for training the target network based on the source network features and the target network features using a guided attention transfer network. In some cases, the operations of this step refer to, or may be performed by, a guided attention transfer network as described with reference to FIGS. 3 and 7.

At operation 825, the system updates parameters of the target network based on the attention map and the ground truth label data. In some cases, the operations of this step refer to, or may be performed by, an active learning component as described with reference to FIG. 3.

Figure 9:
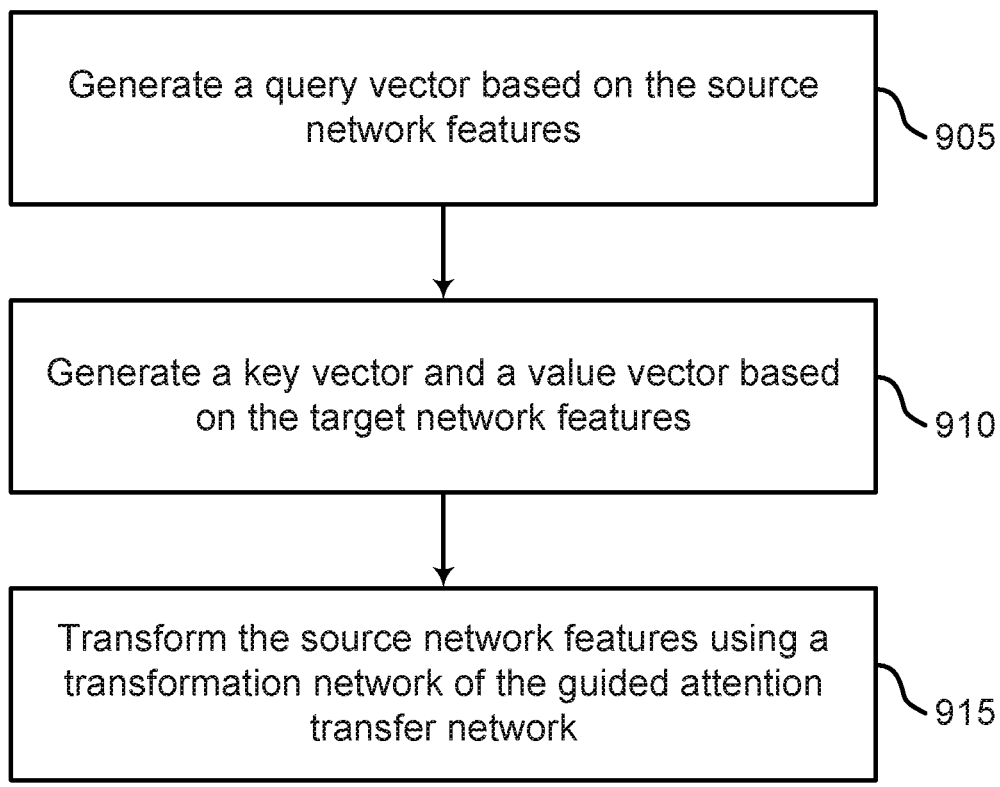
FIG. 9 shows an example of a process for transforming source network features according to aspects of the present disclosure.

FIG. 9 shows an example of 900 for transforming source network features according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system generates a query vector based on the source network features. In some cases, the operations of this step refer to, or may be performed by, a guided attention transfer network as described with reference to FIGS. 3 and 7.

At operation 910, the system generates a key vector and a value vector based on the target network features. In some cases, the operations of this step refer to, or may be performed by, a guided attention transfer network as described with reference to FIGS. 3 and 7.

At operation 915, the system transforms the source network features using a transformation network of the guided attention transfer network. In some cases, the operations of this step refer to, or may be performed by, a guided attention transfer network as described with reference to FIGS. 3 and 7.

Figure 10:
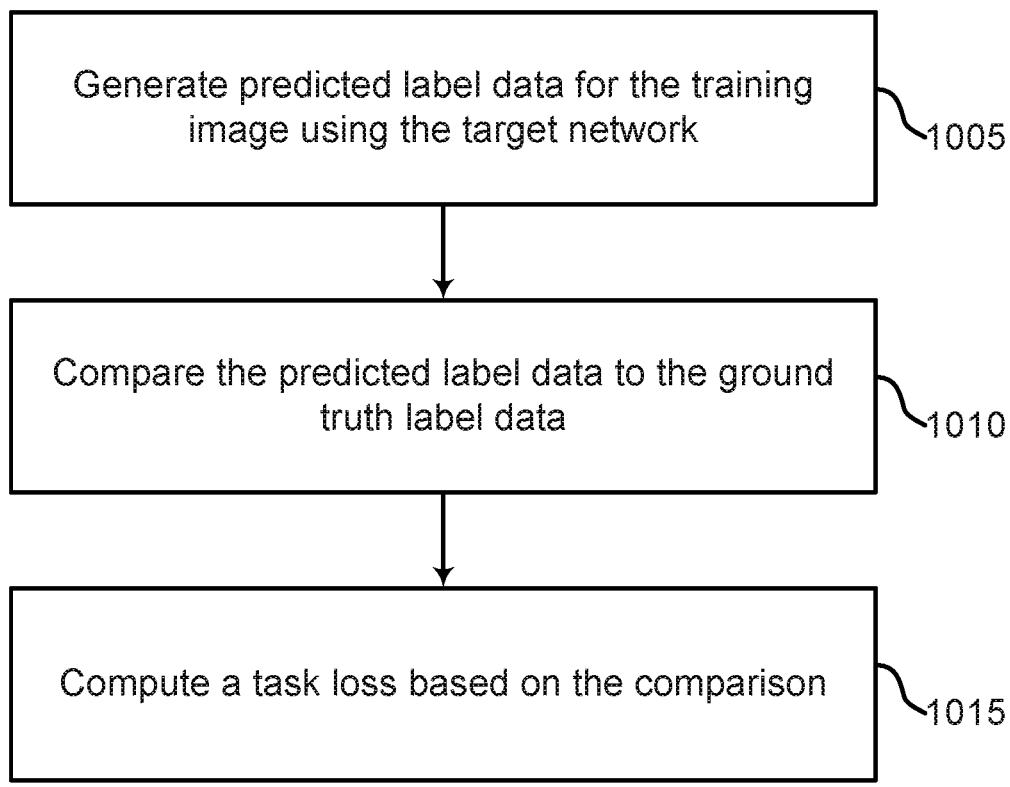
FIG. 10 shows an example of a process for computing a task loss according to aspects of the present disclosure.

FIG. 10 shows an example of 1000 for computing a task loss according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system generates predicted label data for the training image using the target network. In some cases, the operations of this step refer to, or may be performed by, a target network as described with reference to FIGS. 1, 3, and 7.

At operation 1010, the system compares the predicted label data to the ground truth label data. In some cases, the operations of this step refer to, or may be performed by, an active learning component as described with reference to FIG. 3.

At operation 1015, the system computes a task loss based on the comparison. In some cases, the operations of this step refer to, or may be performed by, an active learning component as described with reference to FIG. 3.

Figure 11:
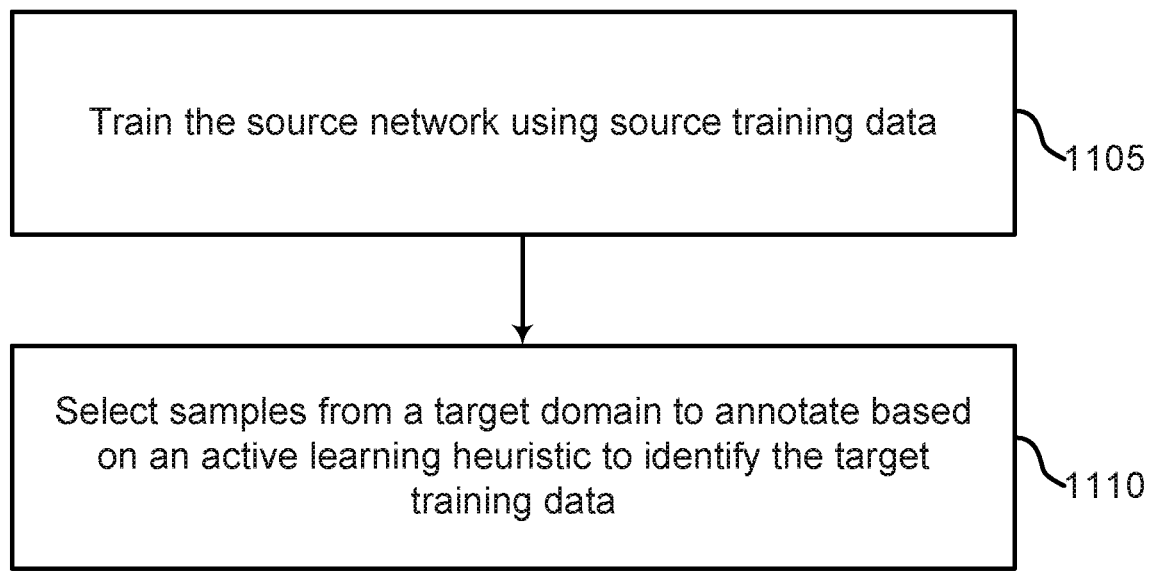
FIG. 11 shows an example of a process for selecting samples according to aspects of the present disclosure.

FIG. 11 shows an example of 1100 for selecting samples according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system trains the source network using source training data. In some cases, the operations of this step refer to, or may be performed by, an active learning component as described with reference to FIG. 3.

At operation 1110, the system selects samples from a target domain to annotate based on an active learning heuristic to identify the target training data. In some cases, the operations of this step refer to, or may be performed by, an active learning component as described with reference to FIG. 3.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
receiving target training data including a training image and ground truth label data for the training image;
generating source network features for the training image using a source network trained on source training data;
generating target network features for the training image using a target network;

generating at least one attention map for training the target network based on the source network features and the target network features using a guided attention transfer network, wherein the at least one attention map indicates regions or channels of the source network features that align with corresponding regions or channels of the target network features; and updating parameters of the target network based on the attention map and the ground truth label data.

2. The method of claim 1, further comprising:
generating a query vector based on the source network features; and
generating a key vector and a value vector based on the target network features, wherein the at least one attention map is based on the query vector, the key vector, and the value vector.

3. The method of claim 2, further comprising:
transforming the source network features using a transformation network of the guided attention transfer network, wherein the query vector is based on the transformed source network features.

4. The method of claim 1, wherein:
the at least one attention map includes a guided spatial attention map that indicates regions of the training image that encourage effective transfer learning from the source network to the target network.

5. The method of claim 1, wherein:
the at least one attention map includes a guided channel attention map that indicates channels of the source network features that encourage effective transfer learning from the source network to the target network.

6. The method of claim 1, further comprising:
computing a difference between the target network features and the source network features; and
computing a transfer loss based on a product of the at least one attention map and the difference, wherein the parameters of the target network are updated based on the transfer loss.

7. The method of claim 1, further comprising:
generating predicted label data for the training image using the target network;
comparing the predicted label data to the ground truth label data; and
computing a task loss based on the comparison, where the parameters of the target network are updated based on the task loss.

8. The method of claim 1, further comprising:
training the source network using source training data, wherein the source training data includes samples from a source domain, and wherein the source training data is not available when the parameters of the target network are updated; and
selecting samples from a target domain to annotate based on an active learning heuristic to identify the target training data, wherein the samples are selected based on a fixed budget of samples.

9. The method of claim 8, further comprising:
generating the ground truth label data based on the selection, wherein the ground truth label data includes labels that are not included in the source training data.

10. The method of claim 8, further comprising:
computing a gradient parameter of the training image using the source network, wherein the active learning heuristic is based on the gradient parameter.

11. The method of claim 8, further comprising:
computing an entropy parameter of the training image using the target network, wherein the active learning heuristic is based on the entropy parameter.

12. The method of claim 8, further comprising:
computing a clustering score of the training image, wherein the active learning heuristic is based on the clustering score.

13. A method comprising:
receiving an image including an element that does not correspond to source label data in a source training set;
generating image features for the image using a target network, wherein the target network is trained based on a target training set, transfer learning from a source network, and a guided attention transfer network, wherein the target training set includes label data corresponding to the element, wherein the source network is trained using the source training set, and wherein the guided attention transfer network generates at least one attention map based on source network features from the source network and target network features from the target network; and
decoding the image features to obtain target label data for the image.

14. The method of claim 13, wherein:
the guided attention transfer network generates a query vector based on the source network features and a key vector and a value vector based on the target network features.

15. The method of claim 14, wherein:
the at least one attention map includes a guided spatial attention map and a guided channel attention map.

16. The method of claim 13, wherein:
the target training set is generated using an active learning heuristic based on a gradient parameter from the source network, an entropy parameter from the target network, a clustering parameter, or any combination thereof.

17. An apparatus comprising:
a source network trained based on source training data from a source domain;
a target network trained using transfer learning from the source network based on target training data from a target domain; and
a guided attention transfer network configured to generate at least one attention map for guiding the transfer learning, wherein the at least one attention map is based on source network features from the source network and target network features from the target network, and wherein the at least one attention map indicates regions or channels of the source network features that align with corresponding regions or channels of the target network features.

18. The apparatus of claim 17, further comprising:
an active learning component configured to select target training images for the target training data based on an active learning heuristic.

19. The apparatus of claim 17, wherein:
the guided attention transfer network comprises a transformation network configured to transform the source network features.

20. The apparatus of claim 17, wherein:
the guided attention transfer network is trained jointly together with the target network.

* * * * *